United States Patent
Young

(10) Patent No.: US 9,490,473 B2
(45) Date of Patent: Nov. 8, 2016

(54) STABILIZED ANODE FOR LITHIUM BATTERY AND METHOD FOR ITS MANUFACTURE

(75) Inventor: Kwo Young, Troy, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 1194 days.

(21) Appl. No.: 13/369,746

(22) Filed: Feb. 9, 2012

(65) Prior Publication Data

US 2013/0209887 A1 Aug. 15, 2013

(51) Int. Cl.
| | |
|---|---|
| *H01B 1/04* | (2006.01) |
| *H01M 4/04* | (2006.01) |
| *H01M 4/36* | (2006.01) |
| *H01M 4/38* | (2006.01) |
| *H01M 4/587* | (2010.01) |

(52) U.S. Cl.
CPC ............ *H01M 4/0423* (2013.01); *H01B 1/04* (2013.01); *H01M 4/366* (2013.01); *H01M 4/386* (2013.01); *H01M 4/387* (2013.01); *H01M 4/587* (2013.01)

(58) Field of Classification Search
CPC ........... H01B 1/00; H01B 1/04; H01M 4/00; H01M 4/04; H01M 2004/021
See application file for complete search history.

(56) References Cited

U.S. PATENT DOCUMENTS

| | | | |
|---|---|---|---|
| 4,600,801 A | 7/1986 | Guha et al. | |
| 4,891,330 A | 1/1990 | Guha et al. | |
| 5,476,789 A | 12/1995 | Farrell et al. | |
| 6,468,829 B2 | 10/2002 | Guha et al. | |
| 6,524,707 B1* | 2/2003 | Rasmussen | 428/408 |
| 2005/0147888 A1 | 7/2005 | Yamamoto et al. | |
| 2006/0134516 A1 | 6/2006 | Im et al. | |
| 2009/0269511 A1* | 10/2009 | Zhamu et al. | 427/558 |
| 2011/0051322 A1* | 3/2011 | Pushparaj et al. | 361/525 |
| 2011/0311874 A1 | 12/2011 | Zhou et al. | |
| 2013/0177820 A1* | 7/2013 | Kumta et al. | 429/306 |
| 2014/0170483 A1* | 6/2014 | Zhang et al. | 429/211 |
| 2014/0231724 A1* | 8/2014 | Osaka et al. | 252/516 |
| 2014/0234713 A1* | 8/2014 | Rojeski | 429/219 |
| 2015/0010788 A1* | 1/2015 | Aria et al. | 429/50 |

FOREIGN PATENT DOCUMENTS

| | | |
|---|---|---|
| JP | 2007234585 A | 9/2007 |
| KR | 10-2005-0115480 | 12/2005 |
| WO | WO-2009009206 | 1/2009 |

OTHER PUBLICATIONS

International Search Report and Written Opinion for PCT/US2013/024886, dated Jun. 2, 2013.
European Search Report for 13746060.6, dated Sep. 8, 2015.
Japanese search report for co-pending international application No. JP 2014-556626 issued May 24, 2016.

* cited by examiner

*Primary Examiner* — Mark Kopec
(74) *Attorney, Agent, or Firm* — Dinsmore & Shohl LLP; Weston R. Gould

(57) ABSTRACT

Disclosed is an anode for a lithium battery comprising a body of carbon, such as graphitic carbon, having a layer of a Group IV element or Group IV element-containing substance disposed upon its electrolyte contacting surface. Further disclosed is an anode comprising a body of carbon having an SEI layer formed thereupon by interaction of a layer of Group IV element or Group IV element-containing substance with an electrolyte material during the initial charging of the battery.

11 Claims, 1 Drawing Sheet

STABILIZED ANODE FOR LITHIUM BATTERY AND METHOD FOR ITS MANUFACTURE

FIELD OF THE INVENTION

This invention relates generally to batteries and more particularly to rechargeable lithium batteries. In particular, the invention relates to a stabilized, carbon based anode for use in rechargeable lithium battery systems.

BACKGROUND OF THE INVENTION

Applications for the use of lithium batteries are growing rapidly. However, problems of cycle life, which is the number of charge/discharge cycles a battery may undergo, as well as problems of calendar life, namely the period of time a battery system is operative, have limited the use of lithium batteries in high energy applications such as hybrid and fully electric vehicle applications. In many instances, lithium batteries employ carbon, and in particular graphite, based anodes; and these anodes can be a significant factor in lowered cycle life and calendar life of lithium batteries in which they are incorporated, owing to exfoliation and other physical degradation of these materials during their operational life.

For purposes of this disclosure the terms "batteries" and "cells" will be used interchangeably when referring to one electrochemical cell, although the term "battery" can also be used to refer to a plurality of electrically interconnected cells. A generalized lithium battery includes an anode and a cathode which are disposed in a volume of a nonaqueous electrolyte material, which typically includes one or more lithium salts and a solvent such as an organic carbonate material. In most instances, the anode and cathode have a body of separator material interposed therebetween. During the charging of the battery, lithium ions travel from the cathode to the anode and are intercalated therein. During discharge of the battery, the process reverses. During the initial charging of the battery, the surface of the anode can react with lithium ions and components of the electrolyte to form a layer of material referred to as a "solid electrolyte interface" (SET) layer. It should be noted that in some instances this SEI layer is also referred to as a "solid electrolyte interphase" layer. The thus produced SEI material is electrically insulating but conductive of lithium ions. The reaction is irreversible and consumes some of the lithium capacity of the battery.

Particular problems arise in connection with graphite and other carbon based anodes since the SEI layer produced during their charging can cause exfoliation of the carbon surface. This exfoliation degrades the integrity of the body of carbon thereby shortening its cycle and calendar lives. Furthermore, such degradation also removes the previously formed SEI layer necessitating reformation during subsequent charge cycles thereby consuming lithium and further decreasing the charge capacity of the battery.

As will be appreciated, stabilization of the SEI layer on carbon based anodes will greatly increase their cycle and calendar lives. In some instances, the prior art has looked to the use of composite material such as two phase materials, coated particles, nanoscale composites, three-dimensional microstructures, and the like in an attempt to stabilize carbon-based anode materials. Such approaches are complex and expensive to implement, and have met with limited commercial success.

Given the problems with stabilizing carbon based anodes, the prior art has also investigated alternative, non-carbon based anode structures. For example, silicon is capable of intercalating large amounts of lithium; however, in doing so it undergoes very large changes in volume, which leads to pulverization and degradation of anode structures. The art has sought to accommodate these volume changes by utilizing composite and/or multiphase structures which include buffer materials. These structures are difficult to implement, and also decrease the amount of lithium which can be intercalated. In another approach thin films of silicon have been proposed as the active component of lithium battery electrodes. While thin films of silicon are not prone to pulverization, the actual amount of silicon they contain is very small and thus their charge capacity per unit area is correspondingly small. Hence, the art is still looking to find methods and materials for stabilizing the surfaces (and associated SEI layers) of carbon based anodes.

As will be explained in detail hereinbelow, the present invention provides a method and structure for stabilizing carbon, and in particular graphite, based anodes of lithium batteries. The methods and materials of the present invention may be implemented utilizing well developed, high volume thin film deposition techniques so as to produce anode structures having an SEI layer which is not only stabilized, but also optimized so as to provide maximum performance. These and other advantages of the invention will be apparent from the drawings, description, and discussion which follow.

BRIEF DESCRIPTION OF THE INVENTION

Disclosed is an anode for a lithium battery which comprises a body of carbon such as graphite and the like. The anode further includes a layer of a Group IV element or Group IV element-containing substance disposed on the electrolyte contacting surfaces of the body of carbon. During the initial charge of the battery, this layer of Group IV element or Group IV element-containing substance participates in the formation of the SEI layer, and the layer thus produced stabilizes the underlying carbon against physical degradation.

In particular instances, the Group IV element or Group IV element-containing substance can be deposited by thin film techniques either chemically by a glow discharge or physically by a DC or RF sputtering method. The Group IV element or Group IV element-containing substance may be amorphous, nanocrystalline, or polycrystalline. Thickness of the Group IV element or Group IV element-containing substance layer is typically in the range of 100-1500 angstroms. In some specific instances, the Group IV element is silicon.

Further disclosed are methods for manufacturing anodes and lithium batteries utilizing the present invention. In that regard, the body of Group IV element or Group IV element-containing substance is disposed upon the carbon portion of the anode, and thereafter the anode is incorporated into a lithium battery cell having a cathode and an electrolyte. The cell is operated in an initial charge mode so as to cause lithium ions to be intercalated into the carbon, and this charging causes the electrochemically active surface of the anode having the Group IV element or Group IV element-containing substance disposed thereupon to interact with the electrolyte and lithium ion so as to form the SEI layer of the present invention.

DETAILED DESCRIPTION OF THE PREFERRED EMBODIMENTS

Figure 1:
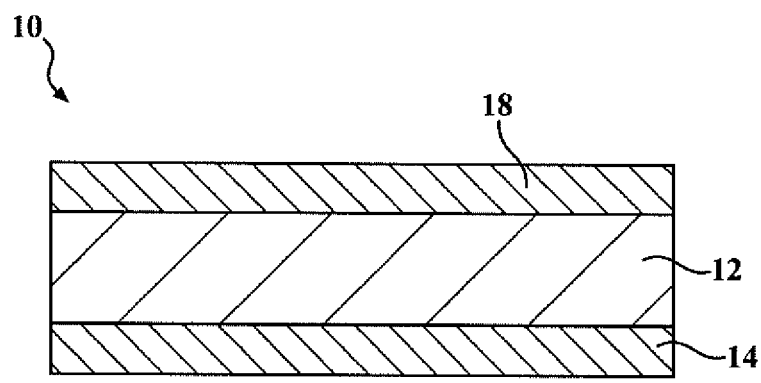
FIG. 1 is a cross-sectional view of an anode structure of the present invention in its initial state after manufacturing.

In accord with the present invention, carbon based anode materials for lithium batteries are stabilized by disposing a relatively thin layer of a Group IV element or Group IV element-containing substance such as a silicon alloy material onto their electrolyte contacting surfaces. This Group IV element or Group IV element-containing substance layer operates to limit exfoliation of the carbon surface and further acts to form an improved, stabilized SEI layer on the carbon surface during the initial charging of the battery. As a result, the inclusion of the Group IV element or Group IV element-containing substance layer enhances both the cycle and calendar lives of the anode and hence batteries in which it is incorporated. Referring now to FIG. 1, there is shown a typical anode structure 10 of the present invention. The anode is comprised of a body of carbon 12 which, in particular instances, may comprise graphitic carbon, although it is to be understood that other types of carbon such as amorphous carbon and the like may also be employed in the practice of the present invention. The carbon 12 may be in the form of a monolithic sheet of graphite or the like, or it may be comprised of particulate carbon held together by a binder, as is known in the art. In some instances, the body of carbon 12 may be comprised of microbeads of mesoporous carbon (MCMB) held together by a binder. As is known in the art, the body of carbon 12 is typically supported on a body of electrically conductive electrode material 14 which may comprise a metallic body in the form of a sheet, mesh, or the like.

Disposed atop the body of carbon 12 is a thin layer of a Group IV element or Group IV element-containing substance 18. This layer 18 covers at least the surface of the body of carbon 12 which will contact an electrolyte when the anode structure 10 is incorporated into a lithium battery. It is notable that the layer 18 covers at least a portion of a surface of the bulk carbon body 12; coverage need not necessarily be complete. As such, this structure is differentiated from composite structures of the prior art wherein various coatings are disposed upon individual particles which are then compressed into a bulk electrode material.

The Group IV element or Group IV element-containing substance layer 18 is relatively thin and in particular instances has a thickness in the range of 100 to 1500 angstroms. As is known in the art, the body of carbon material 12 is very much thicker than the layer 18 and typically has a thickness in the range of 500 to 1000 microns. For purposes of illustration, it should be noted that the thickness of the layer 18 has been exaggerated.

The Group IV element or Group IV element-containing substance 18 typically is present either in the elemental form or as a substance such as alloy, mixture, or compound. Such substances may, as is known in the art, be deposited by various thin film techniques. One specific technique is glow discharge deposition, also known in the art as plasma enhanced chemical vapor deposition (PECVD). In a process of this type, a substrate upon which the layer 18 is to be deposited, in this instance the body of carbon 12, is disposed in a deposition chamber maintained at Certain gas pressure. A process gas which includes gaseous compounds from Group IV elements and other ingredients is introduced into the chamber and energized with electrical energy which may comprise radiofrequency energy, VHF energy, or microwaves. This electrical energy decomposes the process gas resulting in the deposition of a layer of a Group IV element or Group IV element-containing substance onto the anode surface.

In a typical process, the substrate is maintained at an elevated temperature, such as a temperature in the range of 300 to 900 degrees centigrade. Gaseous sources of Group IV elements may include silane, disilane, hydrogenated silane, germanium, and the like. The process gas may also include gaseous compounds of other ingredients, hydrogen, and an inert carrier gas.

As is known in the art, the parameters of the deposition process in terms of gas pressure, activating energy, substrate temperature, and the like may be controlled so as to control the morphology of the depositing layer. In this regard, the Group IV element or Group IV element-containing substance used in the present invention may be amorphous, nanocrystalline, microcrystalline, polycrystalline, or a mixture of the foregoing morphologies.

It is notable that glow discharge deposition techniques of the type described herein may be readily adapted to high volume processes such as continuous deposition processes. Thus, the present invention may be implemented in automated, high volume commercial processes for the preparation of lithium battery electrodes. Some techniques for the glow discharge deposition of thin film silicon alloy materials are shown in U.S. Pat. Nos. 6,468,829; 5,476,789; 4,891,330; and 4,600,801. the disclosures of which are incorporated herein by reference. Other thin film deposition techniques including sputtering techniques, evaporation techniques, and chemical vapor deposition techniques may be likewise employed to deposit the Group IV element or Group IV element-containing substance layer in accord with the present invention.

Further in accord with the present invention, it has been found that when the anodes of the present invention are incorporated into lithium batteries, the layer of Group IV element or Group IV element-containing substance interacts with the surface of the carbon during the initial charging of the battery so as to form an SEI layer which, unlike SEI layers formed in the absence of a Group IV element coating, is resistant to exfoliation and degradation. While not wishing to be bound by theory, Applicant speculates the interaction of the Group IV element with the carbon and the electrolyte forms halogenated Group IV-carbon species which constitute the SEI layer.

Figure 2:
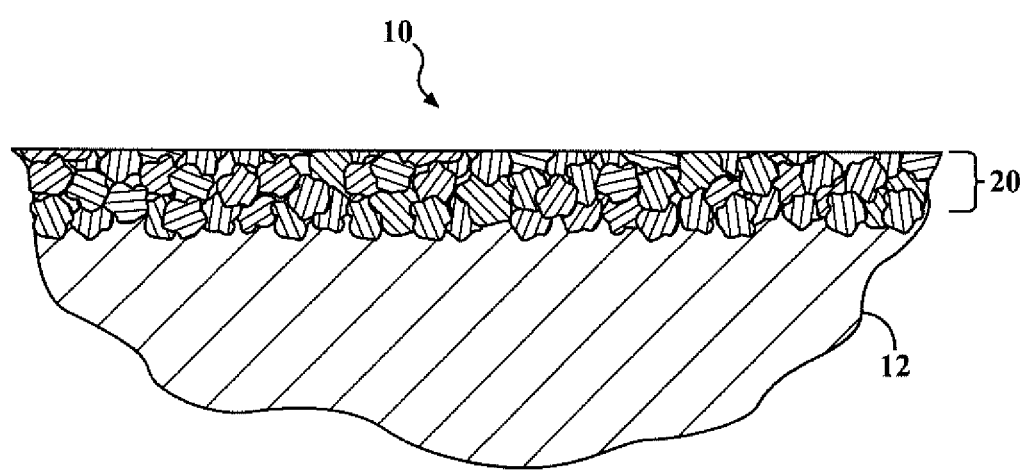
FIG. 2 is an enlarged cross-sectional view of a portion of the anode structure of FIG. 1 following the formation of an SEI layer.

Referring now to FIG. 2, there is shown an enlarged schematic depiction of a portion of an anode having the SEI layer of the present invention formed thereupon. As depicted in FIG. 2, the anode 10 includes the body of carbon 12 having an SEI layer 20 formed upon the electrolyte contacting surface thereof. This SEI layer tends to be nonhomogeneous and includes a number of subregions comprising compounds of the Group IV element or elements, halogens, and carbon compounds such as pyrenes, macrocycles, and the like. This layer 20, with a thickness ranging between 100 and 5000 angstroms, has a good conductivity for lithium ions. Since the SEI layers of the present invention are resistant to exfoliation or other physical degradation, lithium batteries which incorporate the anode materials of the present invention exhibit good cycle and calendar lives while still securing the benefits and advantages of carbon based anode systems.

The foregoing is illustrative of specific embodiments of the present invention. Further modifications and variations thereof will be readily apparent to those of skill in the art. It is the following claims, including all equivalents, which define the scope of the invention.

The invention claimed is:

1. An anode for a lithium battery, said anode comprising:
   an electrically conductive substrate;
   a monolithic sheet of graphite supported on said electrically conductive substrate, said monolithic sheet of graphite having at least one electrochemically active surface which, when said anode is incorporated into a lithium battery, will provide an interface with an electrolyte of said battery; and
   a solid electrolyte interface layer comprised of a reaction product of a portion of said monolithic sheet of graphite and a Group IV element disposed directly on said at least one electrochemically active surface.

2. The anode of claim 1, wherein Group IV element is one or more of: silicon, germanium, tin, or lead.

3. The anode of claim 1, wherein the thickness of said solid electrolyte interface layer is in the range of 100-5000 angstroms.

4. The anode of claim 1 wherein said solid electrolyte interface layer is discontinuous.

5. A lithium battery which includes the anode of claim 1.

6. A method of manufacturing the anode of claim 1 for a lithium battery, said method comprising the steps of:
   providing an anode member comprising a body of monolithic sheet of graphite having at least one electrochemically active surface which, when said anode is incorporated in a lithium battery, will provide an interface with an electrolyte of said battery; and
   coating a layer of a Group IV element or Group IV element-containing substance onto said at least one electrochemically active surface.

7. The method of claim 6, wherein said step of coating said layer of Group IV element or Group IV element-containing substance comprises depositing said layer by a glow discharge deposition process.

8. The method of claim 6, wherein said step of coating a layer of Group IV element or Group IV element-containing substance comprises coating a layer containing one or more of: silicon, germanium, tin, or lead.

9. The method of claim 6, wherein the step of coating a layer of a Group IV element or Group IV element-containing substance comprises coating said layer to a thickness in the range of 100-1500 angstroms.

10. The method of claim 6, including the further steps of:
    disposing said anode in a lithium battery cell comprising a cathode which is spaced apart from said anode, and a volume of electrolyte disposed between said cathode and said anode; and
    operating said lithium battery cell in a charging mode so that lithium is intercalated into said monolithic sheet of graphite wherein said at least one electrochemically active surface of said anode member having said Group IV element or Group IV element-containing substance disposed thereupon interacts with said electrolyte so as to form a solid electrolyte interface layer.

11. The method of claim 10, wherein said electrolyte comprises a lithium salt and an organic carbonate solvent.

* * * * *